(12) United States Patent
Vine et al.

(10) Patent No.: US 10,508,944 B2
(45) Date of Patent: Dec. 17, 2019

(54) APPARATUS AND METHOD FOR DISPENSING FLAVOURING

(71) Applicant: ISHIDA EUROPE LIMITED, Birmingham, West Midlands (GB)

(72) Inventors: Lee Vine, Birmingham (GB); Andrew Potter, Birmingham (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 16/327,798

(22) PCT Filed: Aug. 24, 2017

(86) PCT No.: PCT/GB2017/052491
§ 371 (c)(1),
(2) Date: Feb. 22, 2019

(87) PCT Pub. No.: WO2018/037233
PCT Pub. Date: Mar. 1, 2018

(65) Prior Publication Data
US 2019/0186973 A1 Jun. 20, 2019

(30) Foreign Application Priority Data

Aug. 25, 2016 (GB) .................................. 1614527.8

(51) Int. Cl.
*G01F 11/18* (2006.01)
*G01F 11/24* (2006.01)
(Continued)

(52) U.S. Cl.
CPC .............. *G01F 11/40* (2013.01); *A23P 20/12* (2016.08); *G01F 11/18* (2013.01); *G01F 11/24* (2013.01); *A23L 19/18* (2016.08); *A23L 27/00* (2016.08)

(58) Field of Classification Search
CPC .......... G01F 11/18; G01F 11/24; G01F 11/40; A23P 20/12; A23L 19/18; A23L 27/00
See application file for complete search history.

(56) References Cited

U.S. PATENT DOCUMENTS 509,320 A 11/1893 Long, Jr.
714,026 A 11/1902 Perkins
(Continued)

FOREIGN PATENT DOCUMENTS

BE 888877 A1 9/1981
EP 1643220 A1 4/2006
(Continued)

OTHER PUBLICATIONS

IPO Search Report in GB1614527.8, dated Feb. 22, 2017, 4 pages.
(Continued)

*Primary Examiner* — Frederick C Nicolas

(57) ABSTRACT

A flavouring dispenser for dispensing doses of flavouring is provided. The flavouring dispenser comprises a flavouring chamber for containing flavouring; a dosing plate having an aperture therethrough; and a dispense opening. The dosing plate is movable relative to the dispense opening between a first position and a second position, wherein in the first position the aperture communicates with the flavouring chamber for receiving a predetermined dose of flavouring, and in the second position the aperture communicates with the dispense opening for dispensing the dose of flavouring.

18 Claims, 10 Drawing Sheets

(51) Int. Cl.
    *G01F 11/40*     (2006.01)
    *A23P 20/12*     (2016.01)
    *A23L 19/18*     (2016.01)
    *A23L 27/00*     (2016.01)

(56) References Cited

U.S. PATENT DOCUMENTS

| | | | | |
|---|---|---|---|---|
| 3,185,190 | A | * | 5/1965 | Crawford ............... G01F 11/18 141/360 |
| 3,193,159 | A | * | 7/1965 | Swindler ............... A47G 19/34 222/336 |
| 3,308,995 | A | | 3/1967 | Lee et al. |
| 4,880,150 | A | | 11/1989 | Navin et al. |
| 5,421,491 | A | | 6/1995 | Tuvim et al. |
| 6,962,274 | B1 | * | 11/2005 | Sherman ............... G01F 11/18 222/344 |
| 8,579,166 | B2 | * | 11/2013 | Bernhardsgruetter ........................ A47J 31/404 222/452 |
| 8,827,185 | B2 | * | 9/2014 | Simmons ............... A47J 47/04 222/189.02 |
| 9,469,463 | B2 | * | 10/2016 | Murray ............... B65D 85/8043 |
| 9,591,943 | B2 | * | 3/2017 | Murray ............... A47J 31/404 |
| 9,976,891 | B1 | * | 5/2018 | Fanton ............... G01F 11/42 |
| 10,082,412 | B2 | * | 9/2018 | Kirschner ............... A47J 31/404 |
| 2004/0233775 | A1 | | 11/2004 | Van der Eerden et al. |

FOREIGN PATENT DOCUMENTS

| | | |
|---|---|---|
| FR | 1303147 A | 9/1962 |
| GB | 2556096 A | 5/2018 |
| WO | WO 02/064006 A1 | 8/2002 |
| WO | WO 2009/029790 A1 | 3/2009 |

OTHER PUBLICATIONS

International Search Report in PCT/GB/2017/052491, 3 pages, dated Nov. 16, 2017.
International Preliminary Report on Patentability in PCT/GB/2017/052491, 8 pages, dated Jul. 25, 2018.

* cited by examiner

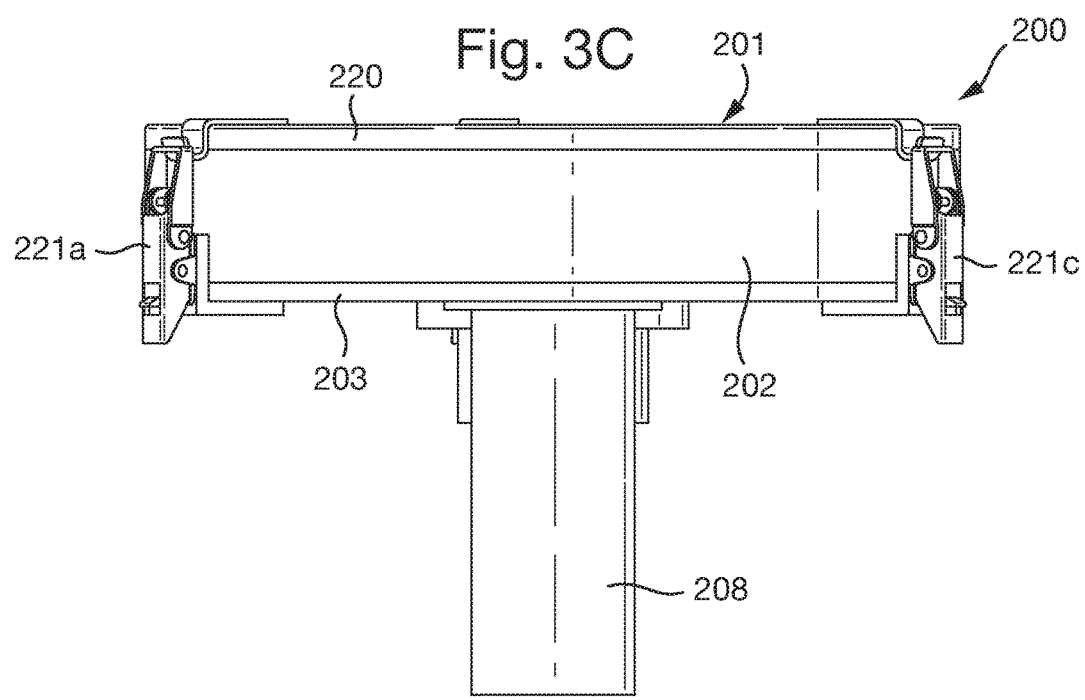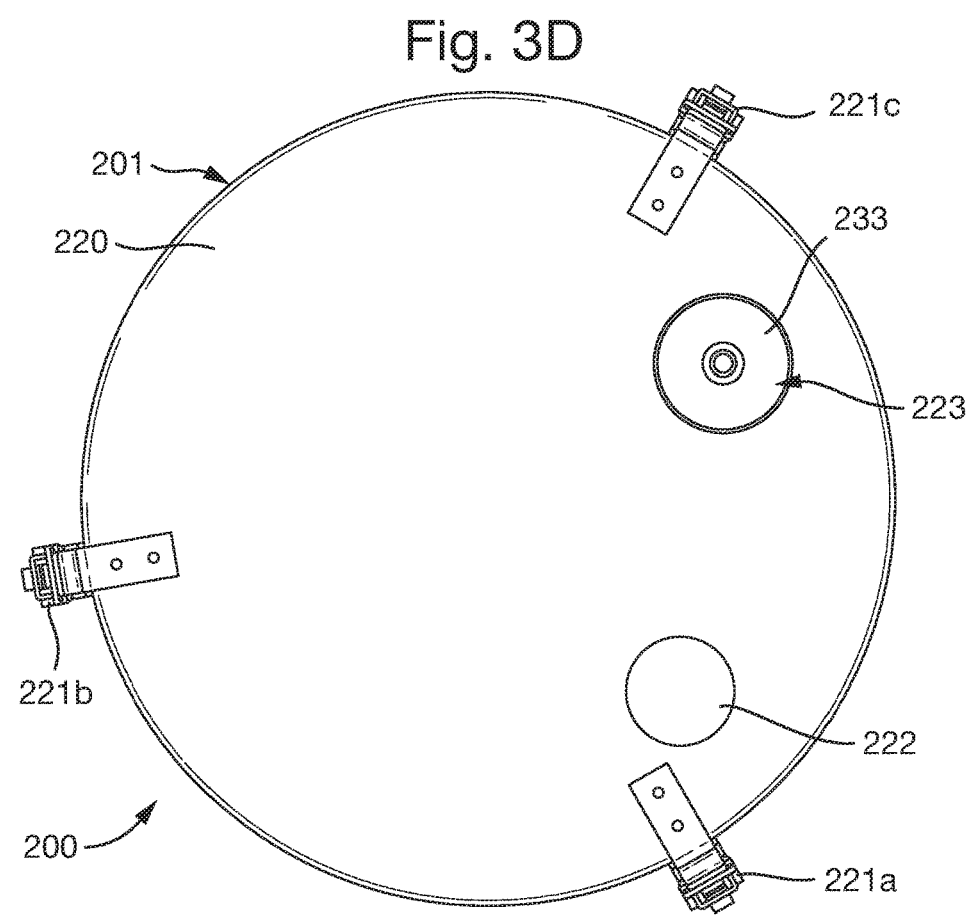

APPARATUS AND METHOD FOR DISPENSING FLAVOURING

FIELD OF THE INVENTION

The present invention is directed to an apparatus and method for dispensing flavouring, and in particular solid granular flavourings such as salt or other potato chip or crisp flavourings.

DESCRIPTION OF THE RELATED ART

When coating individual batches of product in flavouring, it is desirable to ensure that a known and predetermined amount of flavouring is dispensed for each batch of product. Typically, in the art, this has been achieved by weighing a desired amount of flavouring in a weigher before dispensing this downstream for use in further processes. Flavouring dispensers which use a weigher to weigh out a known amount of flavouring are typically quite slow, as they require the flavouring to be settled and held still in order to accurately establish the weight of the flavouring to be dispensed.

Alternative flavouring dispensers are known that measure a quantity of flavouring by filling a volume with flavouring and inferring the weight of the flavouring by knowing its density. Volumetric flavouring dispensers are also typically quite slow as they usually involve filling a chamber of known volume with flavouring before opening the chamber to dispense the flavouring.

Known apparatuses for dispensing predetermined doses of flavouring suffer a number of shortcomings. Many are quite slow, and those which are specialized for high speed dispensing are large and complex, leading to difficulties when changing flavouring and an increase in the burden associated with cleaning. As developments are made to apparatuses, for example, for coating product in flavouring, that increase the rate at which flavouring must be provided, corresponding developments must be made to the flavouring dispensers in order to increase the throughput of the entire system. Attempts have been made in the art to increase the throughput of dosing systems by providing multiple independent channels for preparing doses and operating these in synchrony, however, such solutions vastly increase the cost and complexity of the system and lead to increased cleaning requirements.

SUMMARY OF INVENTION

According to a first aspect, there is provided a flavouring dispenser for dispensing doses of flavouring, the flavouring dispenser comprising: a flavouring chamber for containing flavouring; a dosing plate having an aperture therethrough; and a dispense opening; wherein the dosing plate is movable relative to the dispense opening between a first position and a second position, wherein in the first position the aperture communicates with the flavouring chamber for receiving a predetermined dose of flavouring, and wherein in the second position the aperture communicates with the dispense opening for dispensing the dose of flavouring.

The aperture through the dosing plate preferably holds a fixed volume of flavouring and allows for controlled, volumetric dosages of flavouring to be dispensed. Advantageously, by providing the aperture in communication with a chamber comprising flavouring, it has been found that the amount of time taken for the flavouring to be ready for dispensing is reduced in comparison to systems which, for example, receive a single dose of flavouring from a weigher and then dispense this downstream once it has settled. Further, the dosing plate is simple to replace with a dosing plate having a larger or smaller diameter aperture in order to change the volume of the dose of flavouring that is dispensed.

The term flavouring is intended to cover any material suitable for coating product. The flavouring dispenser is particularly suited to dispensing solid granular flavourings, such as salt or other potato chip flavourings, but may also be used to dispense liquid flavourings, such as marinades.

It should be noted that the aperture through the dosing plate may be freely chosen for any volume of flavouring dose. The aperture is preferably circular, but could alternatively be any shape, such as square or hexagonal, with dimensions selected accordingly. Typically, the aperture will have a constant horizontal cross-section, but it could also be configured to, for example taper inwards or outwards as desired.

In particularly preferable embodiments, the aperture of the dosing plate is elongate along the direction of movement of the aperture between the first position and the second position. Here, it will be appreciated that the direction of movement of the aperture between the first position and the second position is typically the direction that the aperture will move across the dispense opening. In some embodiments, the movement of the aperture is linear, in which case the aperture will be elongated in this linear direction. In other embodiments, the aperture may move along a curved path, in which case the aperture may be elongated along this curved path or elongated in a linear direction that is the direction tangential to the direction of movement of the aperture (the tangential direction being determined from the centre of the aperture). The increased length of the aperture as compared with its width provides that the dose of flavouring is dispensed over a longer period of time without having to slow operation of the dispenser. This elongation of the aperture can be used to shape the dose of flavouring dispensed, i.e. shape the cloud of falling flavouring that is discharged from the device. This is particularly useful where the dose of flavouring is used to coat product while it is falling. An example of a system which uses a falling dose of flavouring to coat product may be found in co-pending UK application number GB 1619581.0.

To further improve the shaping of a dispensed dose of flavouring, preferably the fore and/or rear end of the aperture of the dosing plate, with respect to the direction of movement of the aperture from between the first position and the second position, is tapered such that the rate at which flavouring is dispensed gradually increases and/or decreases as the aperture moves across the dispense opening. Tapering the fore end of the aperture provides that flavouring is dispensed in a gradually increasing manner, shaping the lower end of the dispensed cloud of flavouring. Tapering the rear or aft end of the aperture allows shaping the upper end of the dispensed cloud of flavouring. Tapering both ends may provide an aperture that gradually increases and then decreases in width, shaping both the lower end and upper end of the dispensed cloud of flavouring. An aperture that tapers at the fore or rear end is advantageous as compared with a circular aperture for example, which rapidly increases and decreases in width at the fore and rear ends of the aperture respectively, as it acts to distribute flavouring in the falling cloud of flavouring in a more extended manner, avoiding a cloud which overly dense or concentrated.

Preferably the aperture of the dosing plate is generally ellipse, oval, lens or rhombus shaped. These shapes of aperture have been found to produce falling clouds of flavouring with more favourable shaping for certain applications than, for example, a circular aperture.

The dosing plate is movable relative to a dispense opening. Preferably this will involve the dosing plate being moved relative to both the flavouring chamber and dispense opening (which are fixed relative to one another), however, the dosing plate could alternatively be fixed with respect to the flavouring chamber and a dispense opening moved relative thereto. In both configurations, in a first position, the aperture communicates with the flavouring chamber (and preferably not with the dispense opening) for receiving the dose of flavouring and in a second position communicates with the dispense opening (and preferably not with the flavouring chamber) for dispensing the dose of flavouring.

In particularly preferable embodiments, the dosing plate is rotatable between the first and second positions, for example by being rotatable in a single direction sequentially and repeatedly through the first and second positions. Providing the dosing plate rotatable between the first and second positions is particularly advantageous as it simplifies construction, allowing a driving means having a single drive direction to move the dosing plate repeatedly between the first and second positions. For example, the dosing plate may be substantially circular, and rotatable about its centre between the first and second positions. While a dosing plate that is rotatable through the first and second positions is preferable, in alternative embodiments, the dosing plate may be movable in a reciprocating motion between the first and second positions. When a rotatable dosing plate is used, the dosing plate may be configured to move continuously, without stopping, from the first position through the second position and back to the first position. Alternatively, the dosing plate may be configured to stop at the first and/or second position, using an indexed motion.

Preferably the flavouring dispenser further comprises a drive shaft coupled to the dosing plate for driving the dosing plate between the first and second positions. Rotating the dosing plate by means of a drive shaft is a preferable way of operating the flavouring dispenser as it allows for an increased and consistent output of flavouring. While preferable, in alternative embodiments, the dosing plate may be rotated by other means, for example, by hand.

Preferably the dosing plate has a plurality of apertures therethrough. Providing a plurality of apertures is advantageous as it permits a higher output of flavouring as compared to a dosing plate with a single aperture, in particular because one aperture may be receiving flavouring while a second dispenses flavouring. It is particularly advantageous in combination with a rotatable dosing plate as any number of apertures can be used continuously and sequentially for dispensing flavouring. In embodiments with a plurality of apertures, preferably the apertures have substantially the same area, or are otherwise provided so as to have substantially the same volume, such that each aperture dispenses a consistent dose of flavouring. While preferable, alternative embodiments are foreseen in which the apertures are provided so as to have different volumes, for example, so that the dispenser can dispense different sized doses of flavouring. Further preferably, each of the plurality of apertures has the same shape.

In some embodiments, the dosing plate is located on a floor of the flavouring chamber. As such, a lower opening of the aperture through the dosing plate may be closed by the flavouring chamber floor while in the first position such that the aperture is filled by gravity acting on the flavouring above the aperture. In addition, providing the dosing plate on the floor of the flavouring chamber permits access to the flavouring plate from beneath, for example, for coupling with drive means.

Preferably, the dispense opening is located within the flavouring chamber, and the flavouring dispenser further comprises a separating surface located over the dispense opening and configured to separate an upper side of the aperture from the rest of the flavouring chamber at least while the dosing plate is in the second position. By providing the dispense opening as an opening within the flavouring chamber (e.g. an opening through the floor of the flavouring chamber), a simplified construction of flavouring dispenser is realized in which the dispense opening is located in the flavouring chamber instead of being offset from the flavouring chamber. Reducing the complexity of construction of the flavouring dispenser advantageously reduces the burden associated with cleaning the apparatus between changes of flavouring. Providing the dispense opening as an opening over which the aperture moves in use is an advantageous way of permitting a dose of flavouring to be dispensed downwardly and downstream under gravity for use, for example, in coating product. In such embodiments, the separating surface acts to close the upper side of the aperture to the flavouring chamber while the aperture communicates with the dispense opening. This prevents flavouring from flowing directly from the flavouring chamber, through the aperture and out of the dispense opening, which might cause over dispensing. Alternatively, the dispense opening could be provided laterally offset from the flavouring chamber, e.g. within a separate compartment or chamber of the flavouring dispenser.

In some embodiments the dosing plate is located entirely within the flavouring chamber or entirely within a flavouring dispenser housing which defines the flavouring chamber. This may be achieved by providing that the dosing plate has dimensions smaller than corresponding dimensions of the flavouring chamber. In such cases, preferably the dosing plate is removable from the flavouring chamber. Embodiments in which the dosing plate is located entirely within the flavouring chamber, i.e. in which the dosing plate does not pass through a sidewall of the flavouring chamber, allow the dosing plate to be switched out for a dosing plate having a different thickness, thereby providing another means of altering the volume of a dose of flavouring. In a preferred embodiment of this, the flavouring chamber is substantially cylindrical, and the dosing plate is a substantially disc-shaped dosing plate. The combination of disc-shaped dosing plate with a cylindrical flavouring chamber, in which the diameter of the dosing plate is preferably less than or equal to the diameter of the flavouring chamber, has been found to work particularly well, especially for those embodiments in which the plate is rotatable between the first and second positions. While preferable, other combinations of dosing plate and flavouring chamber are envisaged, for example, a rectangular dosing plate reciprocating in a cuboidal flavouring chamber.

Preferably, the flavouring dispenser further comprises a scraper configured to contact a first surface of the dosing plate as the dosing plate is moved from the first position to the second position so as to move flavouring not received in the aperture away from the aperture. The scraper may act to level off the flavouring in the aperture and ensure only the desired amount of flavouring is dispensed.

While in many embodiments, gravity alone is enough to cause flavouring to be received within the aperture, preferably, the flavouring dispenser further comprises a guiding member which vertically guides and compresses flavouring into the aperture of the dosing plate, preferably while the dosing plate is moved from the first position to the second position. This may help to fill the aperture completely, ensuring consistency in the doses of flavouring dispensed. In some such embodiments, the guiding member laterally guides flavouring towards the aperture, preferably while the dosing plate is moved from the first position to the second position. This further helps ensure filling of the aperture, and can ensure the all of the flavouring in the flavouring chamber is used by the dispenser.

In some embodiments, the guiding member is a wedging member having an inclined surface located over the aperture at a position between the first and second position, the inclined surface being acutely inclined to a direction of movement of the dosing plate from the first position to the second position. By providing a wedging member with such an inclined surface, the movement of the dosing plate from the first position to the second position causes the flavouring to be pressed down and compacted into the aperture. Compacting the flavouring in this way ensures the aperture is completely filled, and maintains a consistency of the amount of flavouring in each dose. The wedging member may also have sidewalls which taper inwards to laterally guide flavouring over the aperture in use.

Preferably, the wedging member further comprises the separating surface, wherein, in use, the wedging member is located over an upper surface of the dosing plate, fixed with respect to the flavouring chamber. It is preferable that the wedging member and separating surface are provided by a single, integral member to reduce the complexity of the device and the amount of cleaning required between flavouring changes. Providing the wedging member such that the surface of the wedging member angles down and transitions into the separating surface to compact the flavouring and then to separate the flavouring dose from the flavouring chamber is particularly preferable. An additional benefit of integrally forming the wedging member and the separating surface is that, in many embodiments, these are the only components which need to be located over or on the dosing plate, and hence this allows different thickness plates to be accommodated with only a change in the height of the wedging member required. The wedging member may be configured to sit on the dosing plate, coupled to some other part of the flavouring chamber to prevent rotation or lifting, in which case the wedging member may be easily adjusted to accommodate an alternative thickness dosing plate. In some embodiments, the wedging member is releasably coupled to the flavouring chamber (e.g. a housing or lid of the flavouring chamber) such that, in use, the wedging member is fixedly held with respect to the flavouring chamber. Preferably, the dosing plate is removable from the flavouring chamber when the wedging member is decoupled from the flavouring chamber.

In some embodiments, the flavouring dispenser is provided with an agitator configured to agitate the flavouring when the dosing plate is in the first position and/or when the dosing plate is in the second position. Providing an agitator, such as a vibrating motor, which agitates flavouring, for example by vibrating the apparatus, encourages flavouring to enter and fill the aperture when in the first position and encourages flavouring to leave the aperture when in the second position. This can increase throughput and help prevent a failure to dispense from occurring.

Preferably, the dosing plate is movable from the first position to the second position via a third position, wherein in the third position the aperture communicates with neither flavouring in the flavouring chamber and the dispense opening. It is preferable that such a position exists between the first and second positions so that the aperture does not begin to dispense until it is no longer in communication with flavouring in the flavouring chamber. This prevents additional flavouring from entering the aperture and ensures the correct volume of flavouring is dispensed. This problem can be avoided by other means, for example, sufficiently fast movement of the dosing plate may prevent over dispensing.

In some embodiments, the flavouring dispenser further comprises a flavouring chute arranged to cooperate with the dispense opening for guiding dispensed flavouring. It is desirable to provide means of guiding flavouring once it is dispensed in order to better integrate a dose of flavouring with downstream systems which require the dose of flavouring.

Preferably, the flavouring dispenser comprises a flavouring chamber opening, for receiving flavouring in use. When the flavouring dispenser is operating for extended periods of time, it is desirable to provide a way of topping up the flavouring chamber without halting operation. Providing an opening into the flavouring chamber, for example, in a roof of the flavouring chamber allows refilling during use.

In some embodiments, the flavouring dispenser further comprises a second dispense opening, wherein movement of the dosing plate from the first position to the second position and back to the first position also moves the aperture from a third position to a fourth position, wherein in the third position the aperture communicates with the flavouring chamber for receiving a second predetermined dose of flavouring, and wherein in the fourth position the aperture communicates with the second dispense opening for dispensing the second dose of flavouring. Providing a second channel for dispensing flavouring can further increase the overall throughput of the flavouring dispenser. It will be appreciated that where a second dispense opening is provided, a corresponding second separating surface, guiding member and/or wedging member may also be provided.

In some embodiments, the flavouring dispenser is provided with a second dispense opening and a second aperture through the dosing plate. In these embodiments, preferably each aperture communicates with both dispense openings at respective positions in a full dispense cycle, however alternatively each may communicate with only a respective one of the dispense openings (for example in reciprocating systems). Movement of the dosing plate between positions for filling and dispensing the second aperture may occur simultaneously with movement of the dosing plate between the first and second positions (and optionally the third and fourth positions). For example, the first position may be the same as a dispensing position of the second aperture and the second position the same as a filling position of the second aperture, in which case, one aperture will be dispensing as the other is receiving flavouring and vice versa. Alternatively, the first position may be the same as a filling position of the second aperture and the second position the same as a dispensing position of the second aperture, in which case, both apertures will dispense at the same time, which may be preferable when very large doses are required. These represent alternative extremes, and it will be appreciated that the filling and dispensing positions of the second aperture could be positioned anywhere with respect to a complete cycle between the first and second positions. It will also be appreciated that the location of the filling and dispensing positions of the second aperture in a cycle of movement of the dosing plate between the first and second positions may be configured by the relative positions of the first and second apertures in the dosing plate (which may be changed by changing the dosing plate) and/or by the relative positions of the dispense openings. It should also be noted that additional channels for dispensing flavour could be provided by including yet further dispense openings and/or dosing plate apertures.

In accordance with a second aspect of the invention, there is provided a method of dispensing a dose of flavouring comprising: providing a flavouring chamber with flavouring; locating a dosing plate having an aperture therethrough in a first position such that the aperture communicates with the flavouring chamber and receives a predetermined dose of flavouring; moving the dosing plate relative to a dispense opening from the first position to a second position at which the aperture communicates with the dispense opening for dispensing the dose of flavouring.

This method of dispensing flavouring is suitable for implementation using a flavouring dispenser according to the first aspect. The method provides the same advantages as the flavouring dispenser according to the first aspect of the invention. Each of the preferable features discussed above in relation to the flavouring dispenser of the first aspect may be implemented as part of an equivalent embodiment of the method according to the second aspect, as will be appreciated by one skilled in the art.

BRIEF DESCRIPTION OF THE DRAWINGS

FIGS. 3A to 3H show a flavouring dispenser according to a second embodiment in perspective, first side, second side, top, third side, first cross-section, plan and second cross-section views respectively;

DETAILED DESCRIPTION OF THE DRAWINGS

Figure 1A:
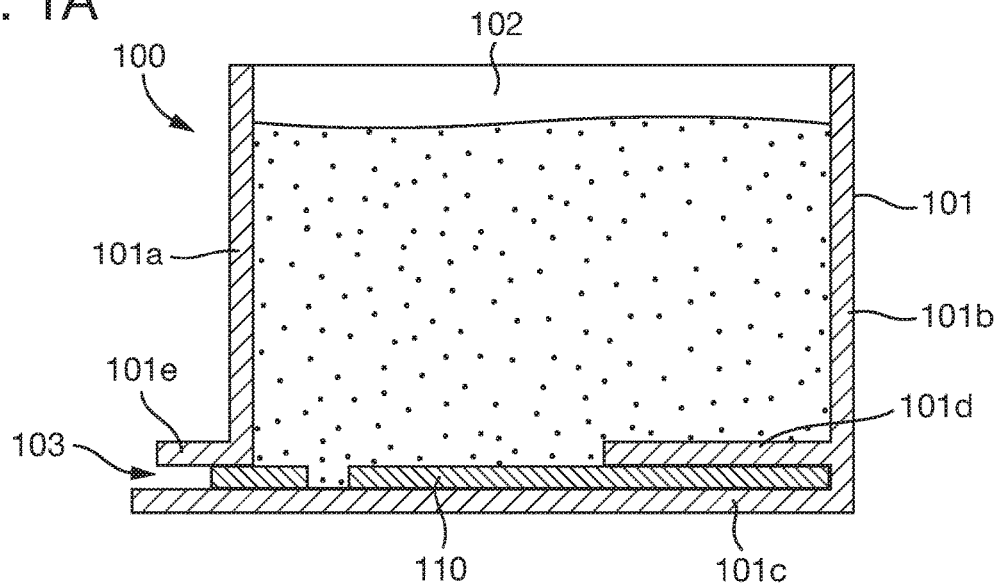
FIGS. 1A and 1B show a flavouring dispenser according to a first embodiment in schematic cross-sectional views, in first and second configurations respectively.
Figure 1B:
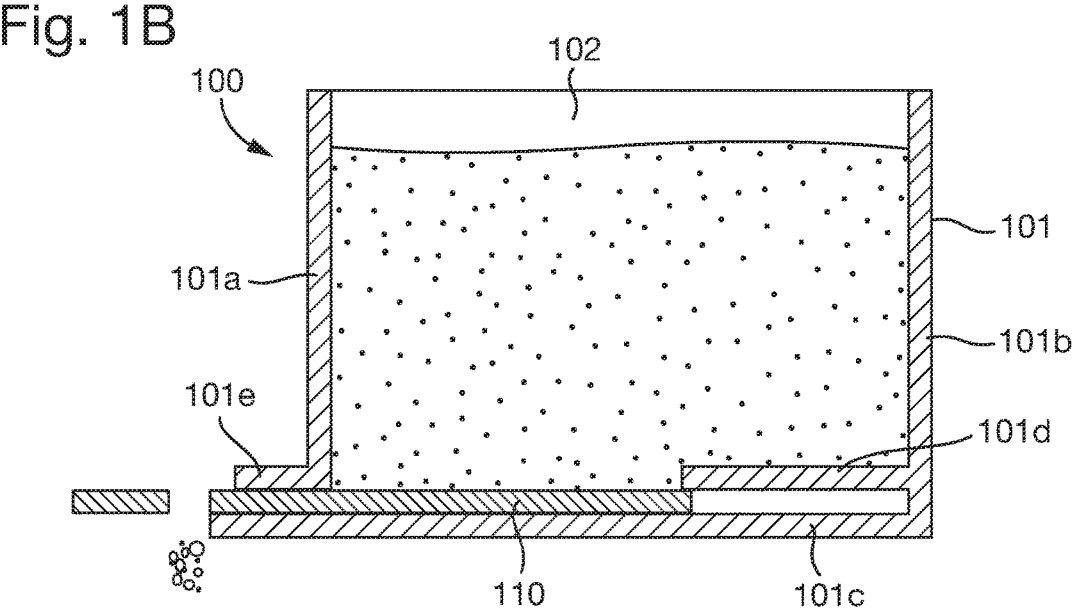
Figure 2:
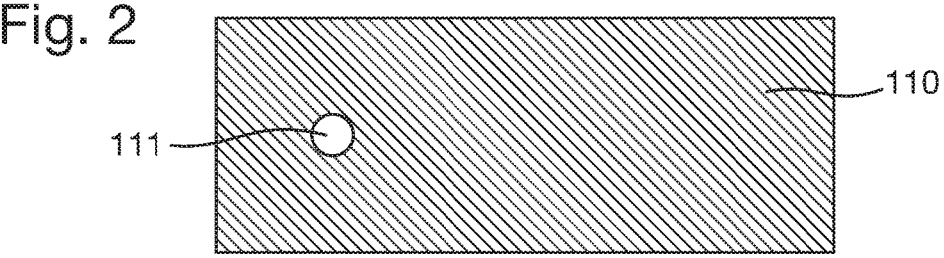
FIG. 2 shows a dosing plate for use in the flavouring dispenser according to a first embodiment in a top view.
Figure 3A:
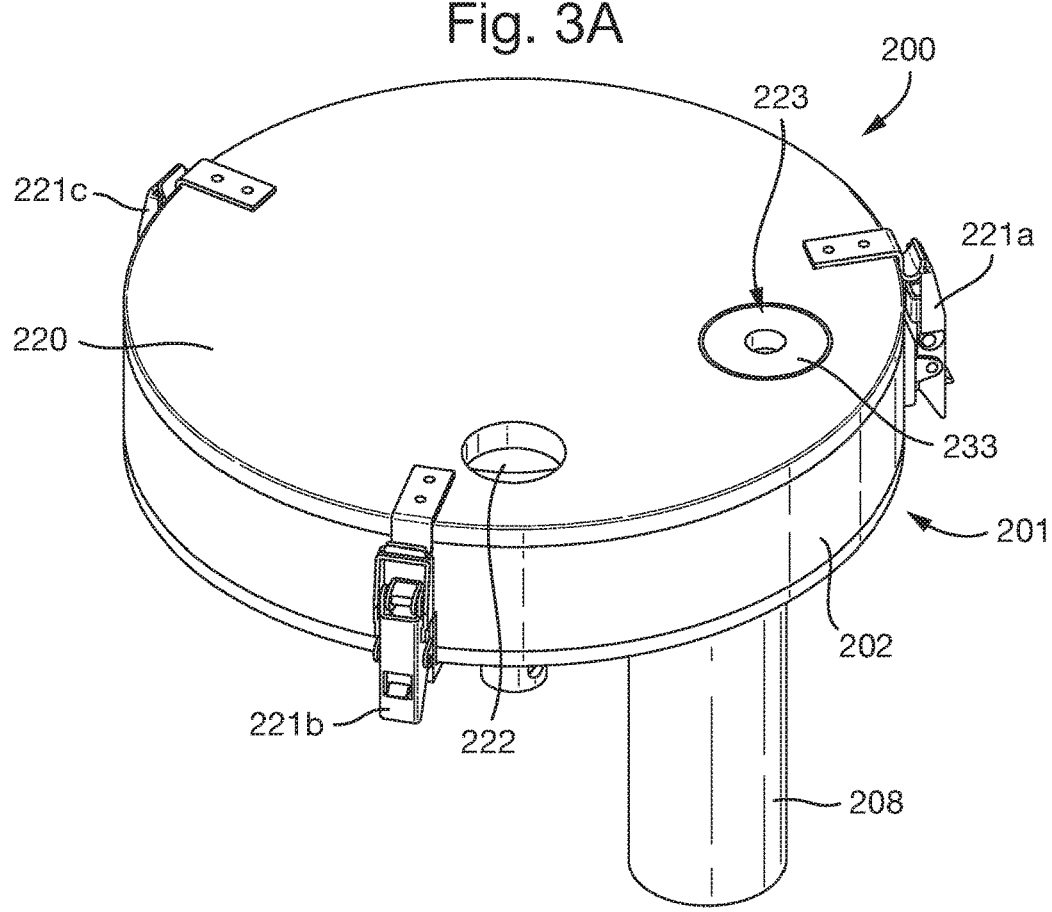
Figure 3B:
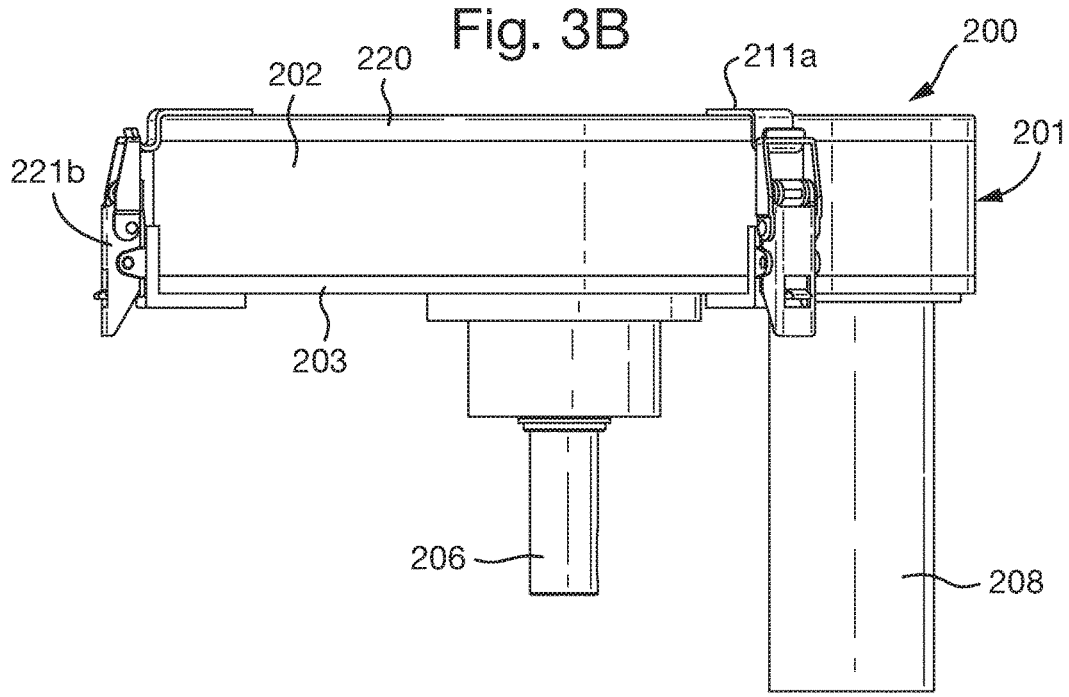
Figure 3E:
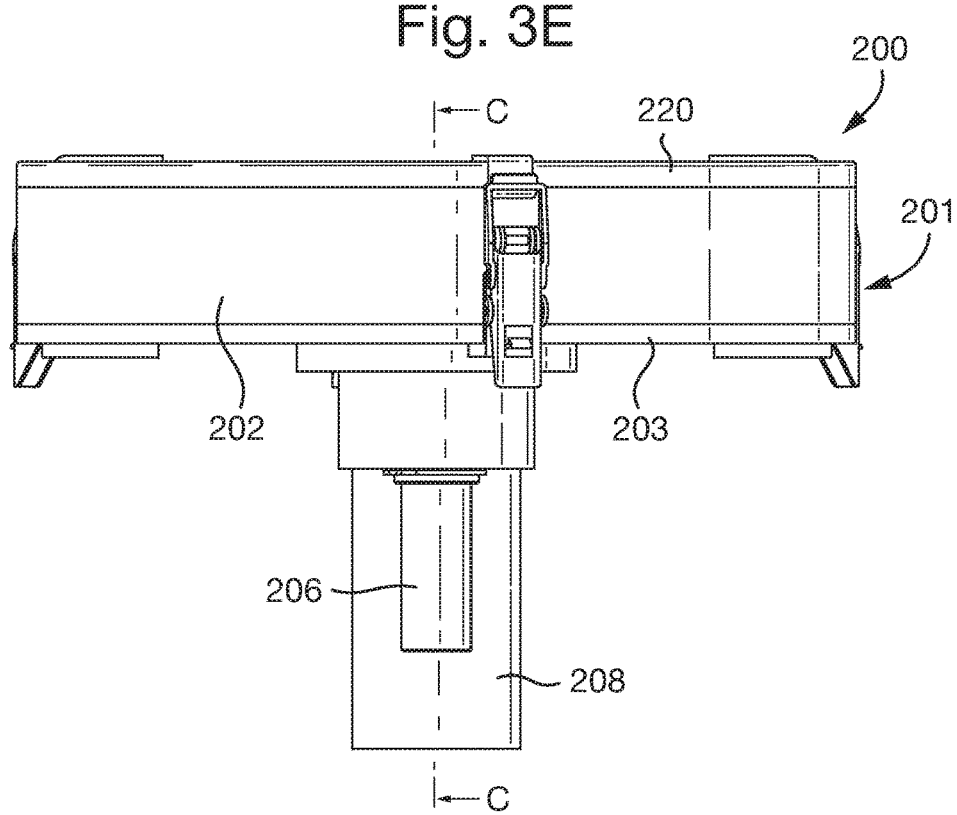
Figure 3F:
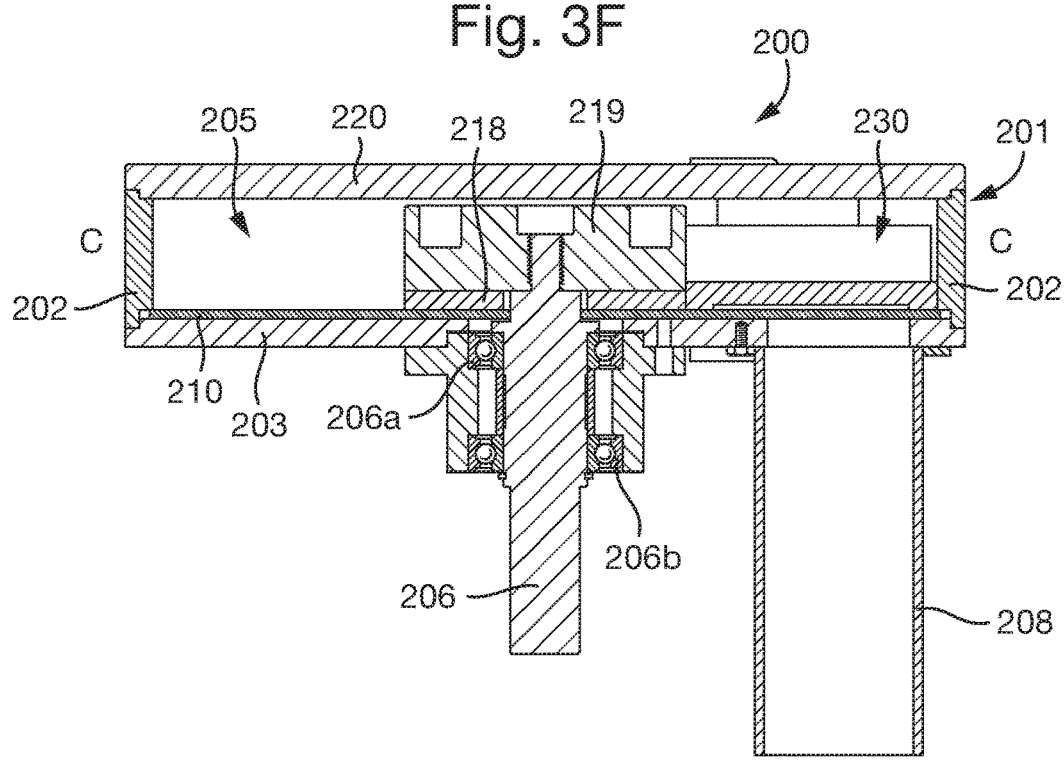
Figure 3G:
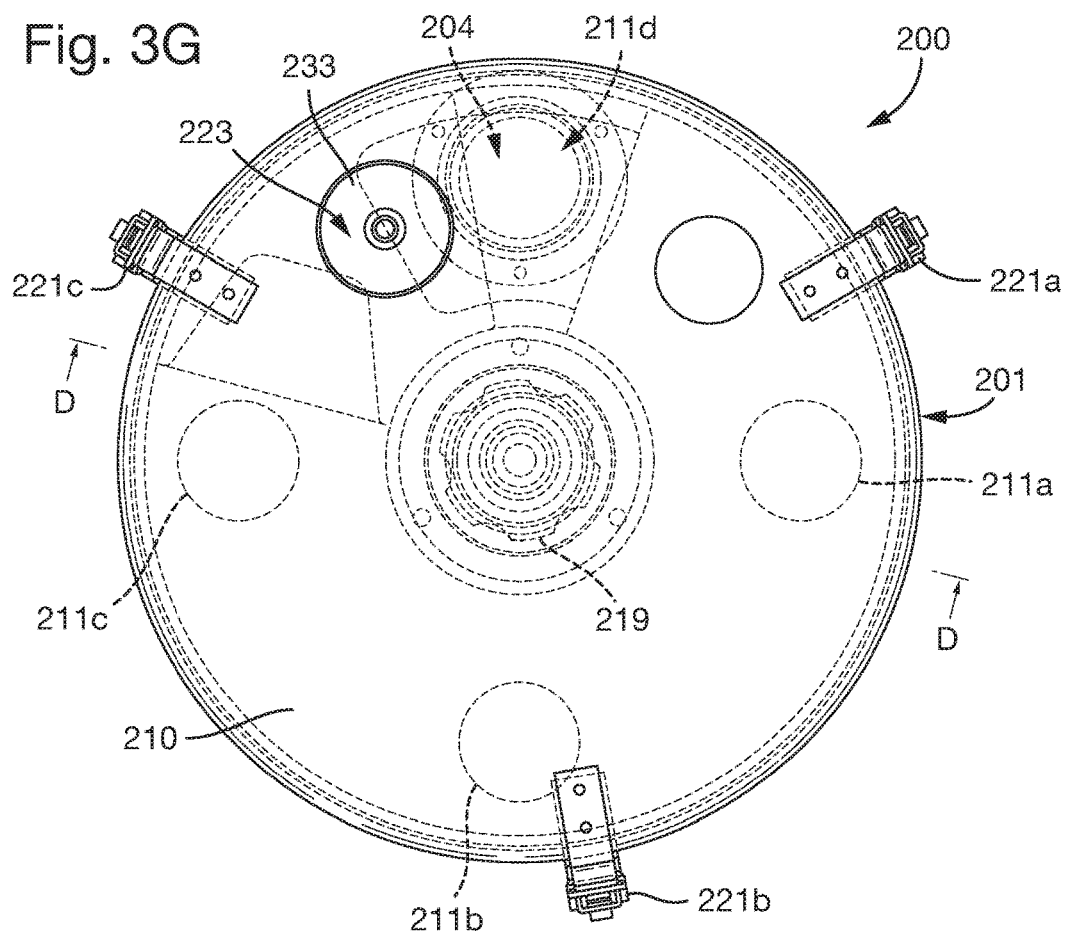
Figure 3H:
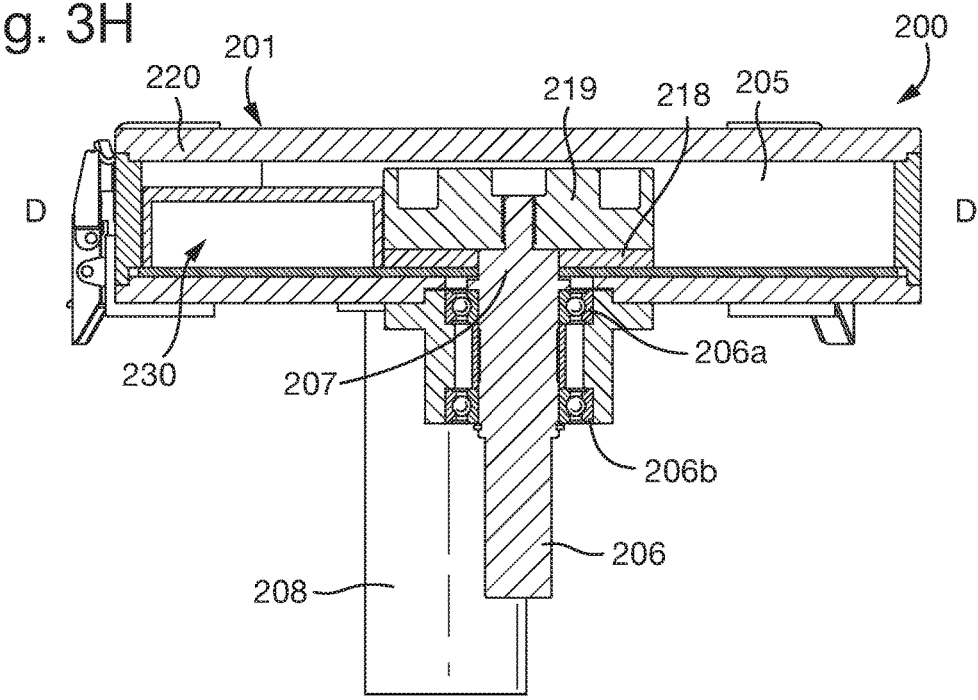
Figure 4:
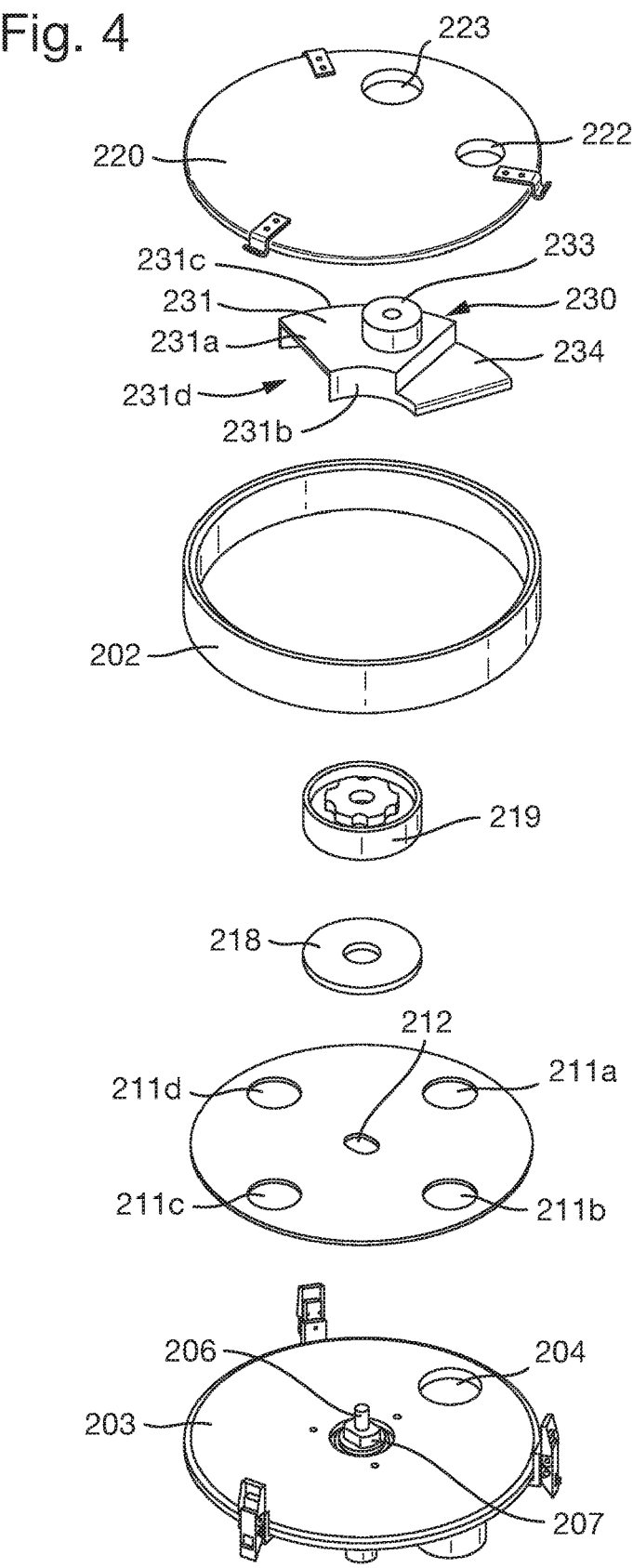
FIG. 4 shows the flavouring dispenser according to the second embodiment in an exploded perspective view.
Figure 5:
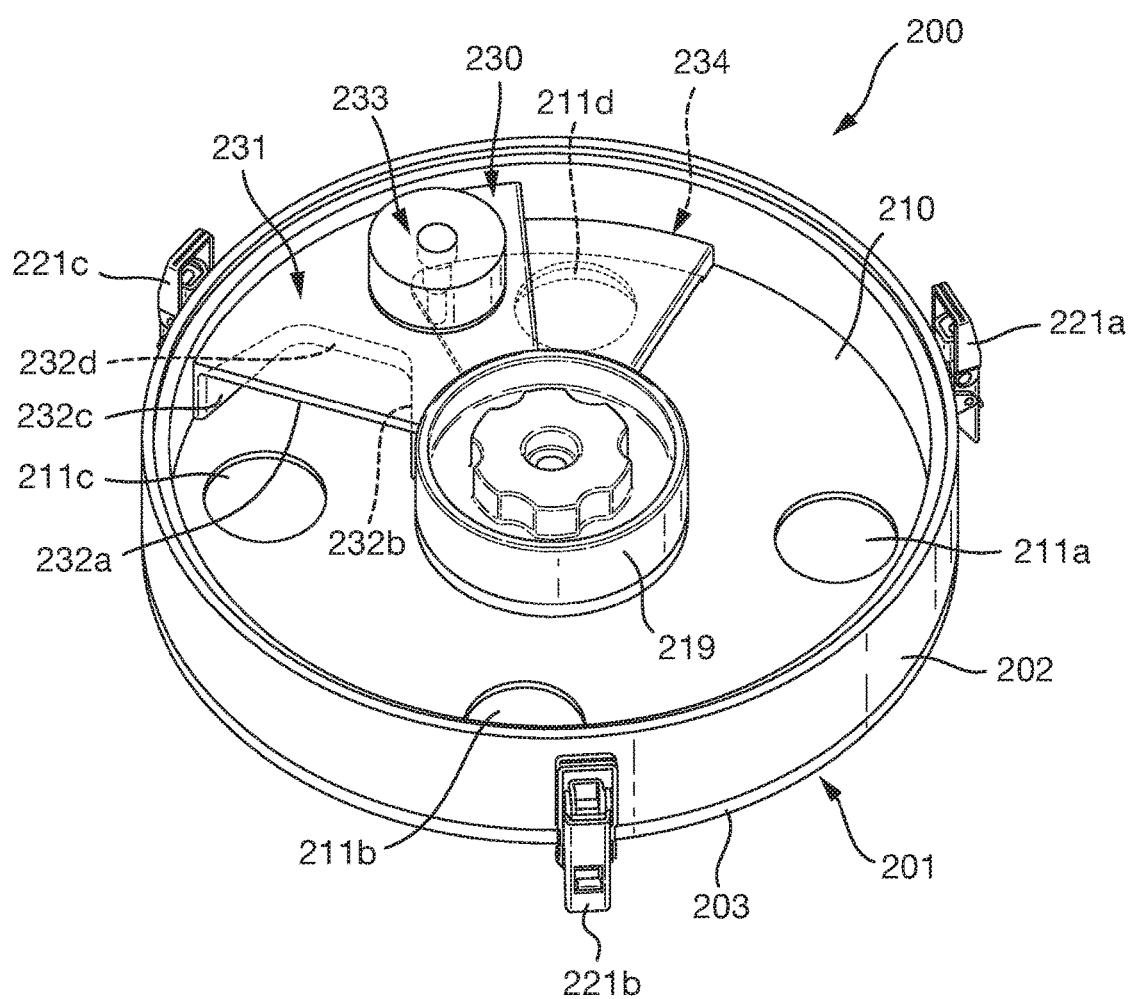
FIG. 5 shows the flavouring dispenser according to the second embodiment in perspective view with a number of components shown as transparent for clarity.

The flavouring dispenser 100 shown in FIGS. 1A, 1B and 2 will now be described in detail. This flavouring dispenser is represented schematically in the drawings and illustrates the inventive concept without many of the further preferable features, which be discussed in detail below.

The flavouring dispenser 100 comprises a generally cuboidal housing 101 which defines an interior flavouring chamber 102. The housing 101 is comprised of four side walls (only front and rear walls 101a, 101b are shown in the drawings) and a floor 101c.

A dosing plate 110 is provided on a floor of the flavouring chamber. The dosing plate 110 is a rectangular plate having a width substantially equal to a width of the flavouring chamber 102 and a length slightly longer than a length of the flavouring chamber such that the dosing plate extends through a gap 103 in the front surface of the housing 101. The dosing plate has a circular aperture 111 extending between its upper and lower surfaces.

In the region of the gap 103, the floor of the flavouring chamber 101c extends beyond the front surface of the housing, and a projection 101e extends from the front surface of the front side wall 101a, thereby defining upper and lower surfaces of the gap 103. The projections help prevent flavouring from flowing out of the flavouring chamber 102 as the aperture 111 of the dosing plate 110 is moved through the gap 103.

The housing 101 further comprises a surface 101d which extends from the rear wall 101b of the housing and covers a part of the upper surface of the dosing plate 110. In use, the surface 101d prevents flavouring from filling the space left by the dosing plate as it is withdrawn through the gap 103. It will be appreciated that this surface is optional, and alternatively, the dosing plate 110 may be shaped to displace flavouring when being re-inserted through the gap 103.

In use, the flavouring chamber 102 is filled with a flavouring for dispensing. The dosing plate is moved, for example by a pneumatic actuator (not shown), between a first and second position to effect the dispensing of flavouring. In the first position (shown in FIG. 1A), the dosing plate is fully inserted through the gap 103 into the flavouring chamber 102 such that the aperture 111 communicates with the flavouring chamber 102 and receives a dose of flavouring. In the second position (shown in FIG. 1B), the dosing plate has been withdrawn through the gap 103 such that the aperture has passed through the gap and beyond the floor of the flavouring chamber 101c, which extends past the front of the housing 101, so that the aperture communicates with a dispense opening (i.e. the front edge of the floor 101c) for discharging flavouring. The gap 103 has a height substantially equal to the thickness of the dosing plate 110 such that the process of withdrawing the plate 110 through the gap 103 causes the top of the dosing plate to be scraped by the front wall 101a, ensuring that the volume of flavouring removed from the flavouring chamber through the gap 103 is substantially equal to the volume of the aperture 111.

The flavouring dispenser 200 shown in FIGS. 3A to 5 will now be described. The flavouring dispenser according to this embodiment operates based on the same inventive concept described with respect to FIGS. 1A to 2, but is configured in a particularly advantageous manner and includes a number of preferable features.

The flavouring dispenser 200 comprises a shallow, cylindrical housing 201. The housing 201 has a sidewall 202 and a floor 203 which define an internal flavouring chamber 205. The housing 201 is closed by a circular lid 220, which is fastened to the housing 201 by three clips 221a, 221b, 221c arranged around the perimeter of the housing 201 which couple the lid to the underside of the floor 203 of the housing 201. The circular lid 220 has first and second circular holes 222, 223 therethrough, the purposes of which are described below.

The floor 203 of the housing comprises a circular plate which has a circular dispense opening 204 therethrough located between the centre of the circular floor 203 and its perimeter. The circular opening opens into a cylindrical flavouring guide 208, which guides dispensed flavouring downstream, as will be described below. An upper surface of the floor of the housing 203 acts as a floor of the flavouring chamber 205. Passing through the centre of the floor 203 is a drive shaft 206, which extends below the floor for coupling with a drive means (not shown). The drive shaft has a key member 207 at its upper end for communicating a driving force to a dosing plate 210. The drive shaft 206 is rotatably mounted on the underside of the floor 203 of the housing 201 by two annular bearings 206a, 206b.

A disc-shaped dosing plate 210 is provided which sits on the floor 203 of the flavouring chamber. The dosing plate has a diameter which is only slightly smaller than the diameter of the floor 203, but is larger than the inner diameter of the sidewall 202 such that the dosing plate extends into a groove located at the point of connection between the sidewall 202 and the floor 203 of the housing 201. At the centre of the dosing plate 210 is an opening 212 which matches the key member 207 of the drive shaft and enables the drive shaft to turn the dosing plate about its centre point. The dosing plate comprises four circular apertures 211a, 211b, 211c, 211d which extend between its upper and lower surfaces. In this embodiment, each aperture has equal diameter so as to receive an equal volume of flavouring in use. Each aperture substantially matches the diameter of the circular dispense opening 204.

The drive shaft 206 is isolated from the flavouring chamber 205 by a washer 218 and a covering member 219 located over the upper end of the drive shaft 206. The covering member 219 leaves exposed an annular portion of dosing plate upper surface and leaves a toroidal volume inside the flavouring chamber 205 free to receive flavouring.

A combined wedging and separating member 230 is provided which sits on the dosing plate 210 in use, over the dispense opening 204. The wedging and separating member 230 is arcuate, and extends radially between the covering member 219 and the inside surface of the sidewall 202, and covers approximately a quarter of the exposed annular portion of the dosing plate. A front half of the wedging and separating member 230 is a wedging portion 231.

It should be noted here that references to "front" and "rear" of the wedging member are made with respect to the direction of turning of the dosing plate in use (which will be described in more detail below), with the dosing plate turning from the front towards the back of the combined wedging and separating member 230.

The wedging portion 231 has an upper surface 231a and first and second side surfaces 231b, 231c which define an open front end 231d. The first side surface 231b is located proximate the covering member 219 and has a radius of curvature to match the covering member 219. The second side surface 231c is located proximate the inside surface of the sidewall 202 and has a radius of curvature to match the inside surface of the sidewall 202. Inside the open front end 231d, inner-side surfaces 232b, 232c and a ceiling 232a of the wedging portion taper together towards a back surface 232d to define a funnelling volume so as to act as a guiding member, as will be described below. Specifically, the ceiling 232a is an inclined surface which angles downwards from the front to the rear of the wedging member, while the side surfaces taper inwards. At the back surface 232d, the wedging member is in contact with the upper surface of the dosing plate 210 between the covering member 219 and the inside surface of the sidewall 202 so as to present a barrier preventing flavouring not in one of the apertures 211a-d from proceeding further towards the dispense opening 204.

Behind the back surface 232d of the wedging portion is a separating portion 234. The separating portion sits over the dispense opening 204 and completely covers it so as to isolate it from the flavouring chamber 205. The separating portion 234 comprises a substantially flat separating surface which extends radially between the covering member 219 and the inside surface of the sidewall 202 over the dispense opening 204. On an underside of the separating surface 234, over the dispense opening 204 is a shallow recess which acts to prevent vacuum forces from keeping the flavouring dose in the aperture 211a-d.

On an upper surface of the combined wedging and separating member 230 is a projecting cylinder 233, which projects upwardly, and is received in the second circular hole 223 through the lid. The projecting cylinder received in the second circular hole 223 secures the wedging and separating member 230 in its position on the dosing plate 210 over the dispense opening 204 and prevents rotation of the dosing plate from moving the wedging and separating member 230.

Optionally, the flavouring dispenser 200 may be provided with a vibrating motor (not shown) coupled to the housing 201 to act as an agitator for encouraging movement of flavouring in use.

Assembly and subsequent operation of the flavouring dispenser 200 will now be described.

A dosing plate 210 with the desired number of apertures and aperture size is placed on the floor 203 of the housing, with the key member 207 of the drive shaft 206 being received in the opening 212 in the centre of the dosing plate 210. It should be noted here that the dosing plate 210 may also be provided with a different thickness depending on the desired volume of flavouring per dose. Where thickness is to be changed, the dosing plate may still be provided with a thin outside edge to be received in the groove defined at the connection between the sidewall 202 and floor 203 of the housing 201.

The washer 218 and covering member 219 are placed over the end of the drive shaft 206, on the upper surface of the dosing plate 210. The sidewall 202 of the housing is put in place, and the wedging and separating member 230 located inside the flavouring chamber 205 that is now defined.

Finally, the lid 220 is placed on, with the projecting cylinder 233 of the wedging and separating member 230 being properly located in the second hole 223 so that the dispense opening 204 is covered by the separating portion 234, and the lid is fastened in place by clips 221a, 221b, 221c which fasten the lid to the floor 203 and hold the structure together.

Flavouring is introduced into the flavouring chamber 205 through the first hole 222 through the lid 220. In use, the flavouring chamber may be refilled through the first hole 222 when desired, e.g. when the chamber is beginning to empty.

Any apertures 211a-d that are located in the flavouring chamber 205 and not isolated from the flavouring chamber by the wedging and separating member 230 will receive flavouring under gravity. Filling of the apertures may be facilitated by vibration of the vibrating motor, if provided.

In use, the dosing plate is continuously turned in the one direction to cause flavouring of the desired doses to be dispensed. The dispense of a dose of flavouring will now be described with reference to a single aperture 211a.

A first aperture 211a, located in the flavouring chamber 205 moves towards the wedging and separating member 230 through rotation of the dosing plate 210 by the drive shaft 206. As the dosing plate is turned, flavouring in the flavouring chamber 205 is generally encouraged towards the wedging and separating member 230. As the aperture passes under the open front end 231d of the wedging portion 231 of the wedging and separating member 230, flavouring is encouraged into open front end 231d of the wedging portion. The tapered inner walls of the wedging portion 231 compact the flavouring and press it down into the aperture 211a, ensuring it is completely filled. As the aperture passes under the back surface 232d, the back surface 232d acts as a scraper, preventing any flavouring not located in the aperture from passing towards the dispense opening 204.

The aperture 211a, filled with a known volume of flavouring, continues towards the dispense opening 204. It should be noted that the distance between the back surface 232d and the dispense opening 204 is such that the rear of the aperture 211a is no longer in communication with the flavouring chamber 205 by the time the front end has arrived at the dispense opening 204. This helps prevent flavouring from flowing freely from the flavouring chamber 205 to the dispense opening 204 through the aperture 211a.

As the dosing plate 210 continues to turn, the aperture 211a is moved over the dispense opening 204, at which point the dose of flavouring falls under gravity through the dispense opening 204 and is guided downstream by the flavouring guide. Dispensing may be facilitated by the vibrating of a vibrating motor, if provided.

Further turning of the dosing plate 210 returns the aperture 211a to the flavouring chamber 205, at which point it receives a subsequent dose of flavouring to begin a new dosing cycle.

Figure 6:
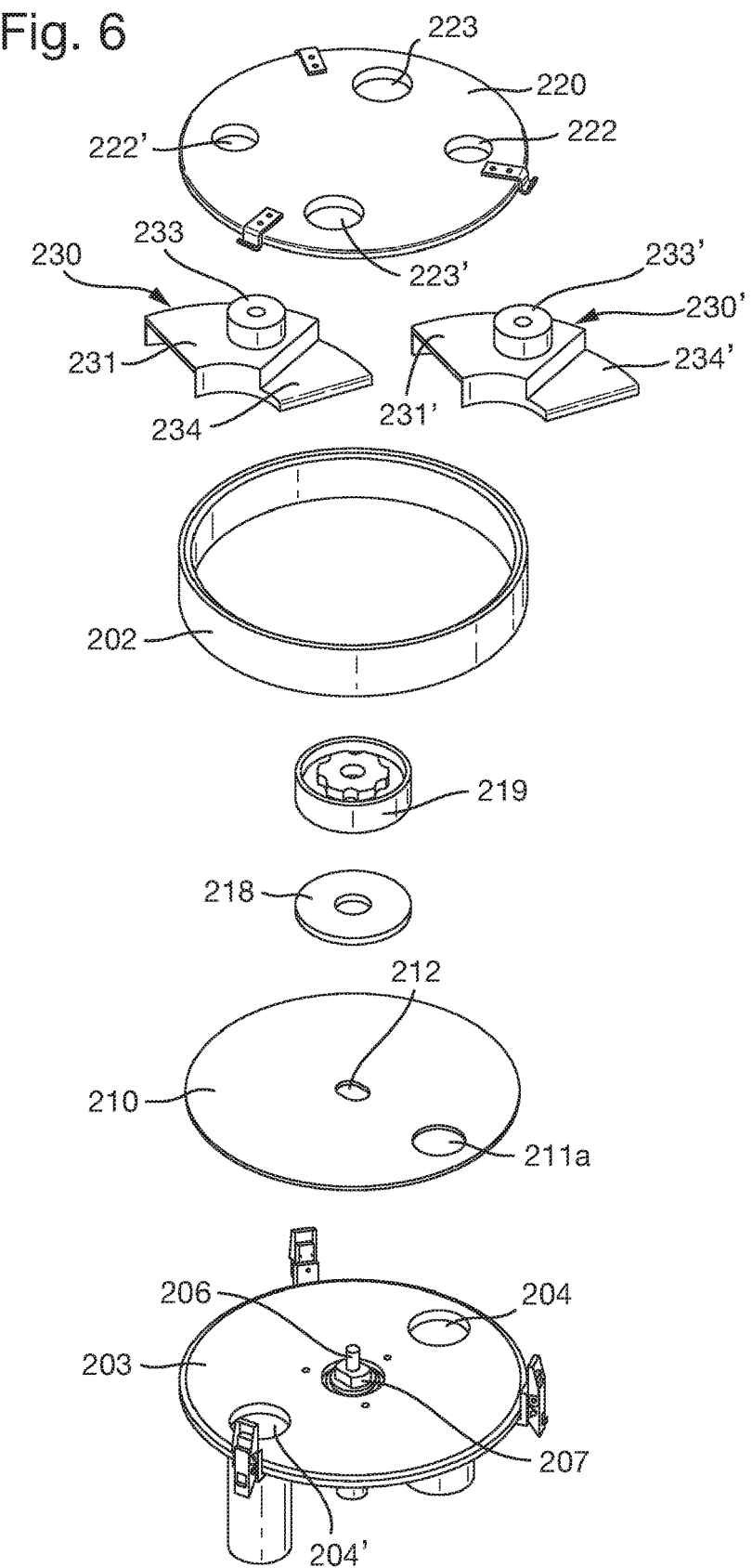
FIG. 6 shows a flavouring dispenser according to a third embodiment in an exploded perspective view.

A third embodiment will now be described with reference to FIG. 6. This embodiment is similar to the second embodiment, but further comprises a second dispense opening for dispensing doses of flavouring. Specifically, the floor 203 of the housing is provided with the first dispense opening 204 and additionally with a second dispense opening 204' located directly opposite the first, or 180° from the first with respect to a complete rotation cycle of the dosing plate 210.

In this embodiment, the dosing plate 210 is provided with only one aperture 211a therethrough; however, additional apertures could be provided. Further, since two dispense openings are provided, a second combined wedging and separating member 230' is provided, which comprises the same elements as the first wedging and separating member 230, i.e. a wedging portion 231', a projecting cylinder 233', and a separating portion 234'. The second wedging and separating member 230', in use, sits on the dosing plate 210, over the second dispense opening 204'. Finally, the lid 220 is provided additionally with third and fourth circular holes 222', 223', located opposite the first and second holes 222, 223 respectively. The projecting cylinder 233' of the second wedging and separating member 230' is received in the fourth hole 223' to hold it in place over the second dispense opening 204'. Since the second wedging and separating member 230' effectively divides the flavouring chamber into two isolated halves, the third hole 222' is provided in addition to the first 222 to permit both halves of the flavouring chamber to be refilled during use.

Figure 7A:
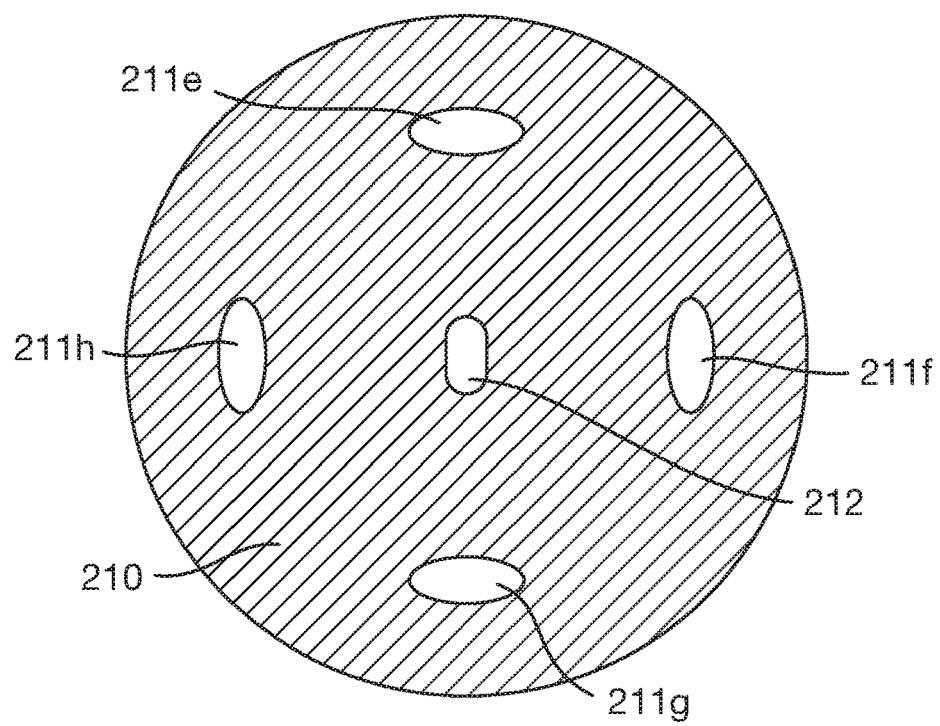
FIGS. 7A to 7D show, in plan view, three alternative dosing plates for use in the flavouring dispenser according to the second embodiment and a partial cross-section of a flavouring dispenser according to the second embodiment fitted with one of the alternative dosing plates.
Figure 7B:
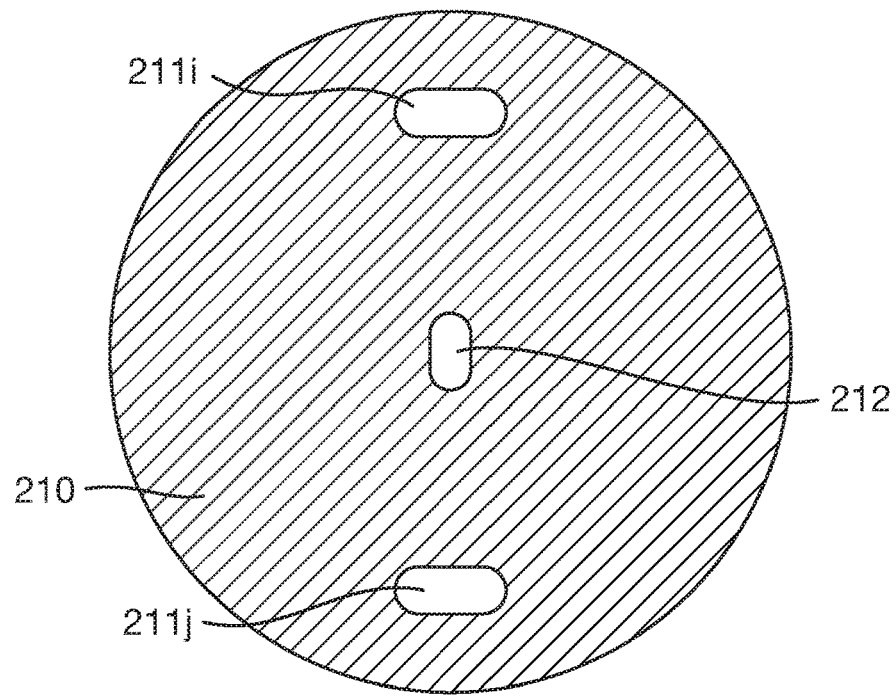
Figure 7C:
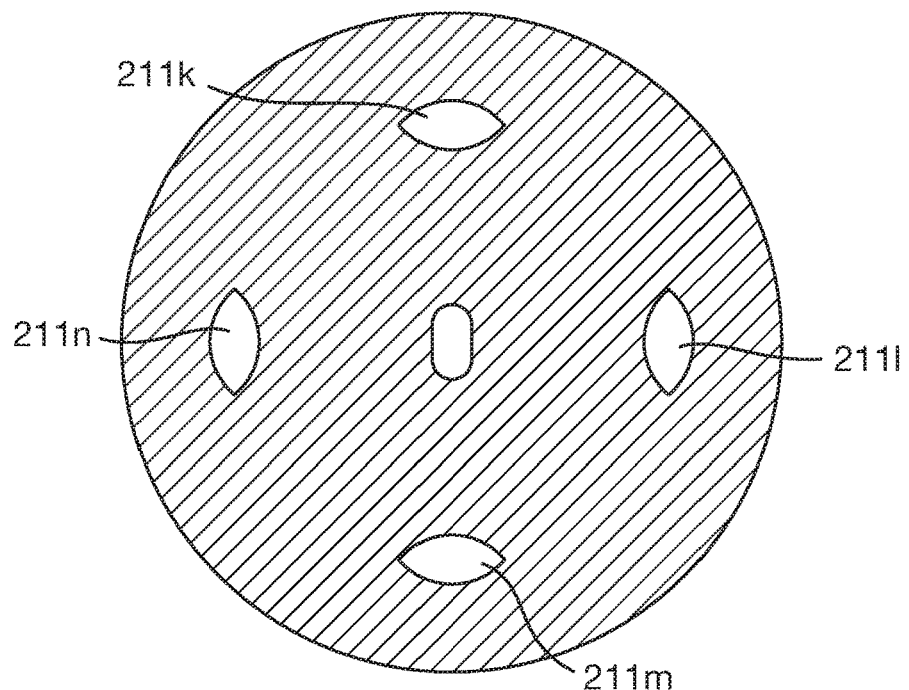

Some alternative dosing plates will now be described FIGS. 7A to 7D. FIGS. 7A to 7C show three different dosing plates substantially as described above with respect to FIGS. 3A to 5. Each dosing plate 210 is disc-shaped dosing and is sized to sit on the floor 203 of a flavouring chamber of a corresponding flavouring dispenser (shown in FIG. 7D and substantially as has been described above with respect to FIGS. 3A to 5). As with the previously described dosing plate, at the centre is an opening 212 which matches the key member 207 of the drive shaft and enables the drive shaft to turn the dosing plate about its centre point. The dosing plate shown in FIG. 7A comprises four apertures 211e, 211f, 211g, 211h equally spaced about the dosing plate and which extend between its upper and lower surfaces. In this embodiment, each aperture is ellipse shaped and is elongate along a direction tangential to the path about which apertures moves (the tangent being determined from the centre of each aperture). In other embodiments, the apertures may be bent ellipses, such that the apertures follow the curved path about which the apertures move.

FIG. 7B shows a dosing plate 210 similar to FIG. 7B, except in that only two apertures are provided 211i, 211j and in that these apertures are oval shaped. These oval apertures are elongate in the same sense as the elliptical apertures of FIG. 7A.

Figure 7D:
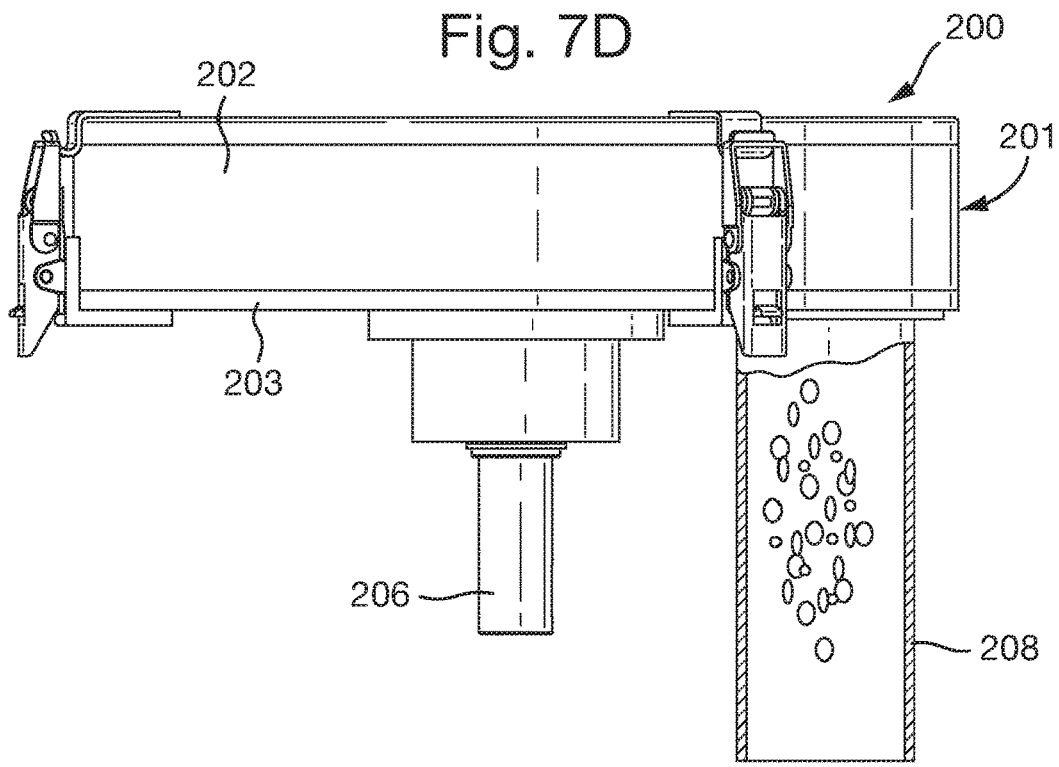

FIG. 7C shows another dosing plate 210, similar to those of FIGS. 7A and 7B. Here, there are provided four lens shaped apertures 211k, 211l, 211m, 211n, again provided so as to be elongate in the same sense as the elliptical and oval apertures described above. These lens shaped apertures exhibit distinctly tapered fore and rear ends, which gradually increase and then decrease the width of the aperture over its length. FIG. 7D shows a side view of a flavouring dispenser fitted with the dosing plate 210 of FIG. 7C. The flavouring guide 208 is shown in cross-section, revealing a dispensed dose of flavouring. The dose of flavouring dispensed from the aperture 211k of the FIG. 7C dosing plate 210 is shaped in correspondence with the shape of the aperture. Here the cloud of flavouring is more elongated and exhibits a more gradual increase in flavouring density as compared with a dose dispensed from a circular aperture.

The invention claimed is:

1. A flavouring dispenser for dispensing doses of flavouring, the flavouring dispenser comprising:
a flavouring chamber for containing flavouring;
a dosing plate having an aperture therethrough; and
a dispense opening; wherein
the dosing plate is movable relative to the dispense opening between a first position and a second position, wherein in the first position the aperture communicates with the flavouring chamber for receiving a predetermined dose of flavouring, and wherein in the second position the aperture communicates with the dispense opening for dispensing the dose of flavouring, wherein the dispense opening is located within the flavouring chamber, and wherein the flavouring dispenser further comprises a separating surface located over the dispense opening and configured to separate an upper side of the aperture from the flavouring chamber at least while the dosing plate is in the second position; and
further comprising a guiding member which vertically guides and compresses the flavouring into the aperture of the dosing plate, wherein the guiding member is a wedging member having an inclined surface located over the aperture at a position between the first and second position, the inclined surface being acutely inclined to a direction of movement of the dosing plate from the first position to the second position, and wherein the wedging member further comprises the separating surface, wherein the wedging member is releasably coupled to the flavouring chamber such that, in use, the wedging member is located over an upper surface of the dosing plate and is fixedly held with respect to the flavouring chamber, and wherein the dosing plate is removable from the flavouring chamber through the flavouring chamber when the wedging member is decoupled from the flavouring chamber.

2. A flavouring dispenser according to claim 1, wherein the dosing plate is rotatable between the first and second positions.

3. A flavouring dispenser according to claim 2, further comprising a drive shaft coupled to the dosing plate for driving the dosing plate between the first and second positions.

4. A flavouring dispenser according to claim 1, wherein the aperture of the dosing plate is elongate along the direction of movement of the aperture between the first position and the second position.

5. A flavouring dispenser according to claim 1, wherein the fore and/or rear end of the aperture of the dosing plate, with respect to the direction of movement of the aperture from between the first position and the second position, is tapered such that a rate at which the flavouring is dispensed gradually increases and/or decreases as the aperture moves across the dispense opening.

6. A flavouring dispenser according to claim 1, wherein the aperture of the dosing plate has a shape selected from the group consisting of ellipse, oval, lens or rhombus.

7. A flavouring dispenser according to claim 1, wherein the dosing plate has a plurality of apertures therethrough.

8. A flavouring dispenser according to claim 1, wherein the dosing plate is located on a floor of the flavouring chamber.

9. A flavouring dispenser according to claim 1, wherein the dosing plate is located entirely within the flavouring chamber.

10. A flavouring dispenser according to claim 9, wherein the flavouring chamber is substantially cylindrical, and wherein the dosing plate is a substantially disc-shaped dosing plate.

11. A flavouring dispenser according to claim 1, further comprising a scraper configured to contact a first surface of the dosing plate as the dosing plate is moved from the first position to the second position so as to move the flavouring not received in the aperture away from the aperture.

12. A flavouring dispenser according to claim 1, wherein the guiding member laterally guides the flavouring towards the aperture.

13. A flavouring dispenser according to claim 1, further comprising an agitator configured to agitate the flavouring when the dosing plate is in the first position and/or when the dosing plate is in the second position.

14. A flavouring dispenser according to claim 1, wherein the dosing plate is movable from the first position to the second position via a third position, wherein in the third position the aperture communicates with neither of the flavouring chamber and the dispense opening.

15. A flavouring dispenser according to claim 1, further comprising a flavouring chute arranged to cooperate with the dispense opening for guiding dispensed flavouring.

16. A flavouring dispenser according to claim 1, further comprising a flavouring chamber opening, for receiving flavouring in use.

17. A flavouring dispenser according to claim 1, further comprising a second dispense opening, wherein movement of the dosing plate from the first position to the second position and back to the first position also moves the aperture from a third position to a fourth position, wherein in the third position the aperture communicates with the flavouring chamber for receiving a second predetermined dose of flavouring, and wherein in the fourth position the aperture communicates with the second dispense opening for dispensing the second dose of flavouring.

18. A method of dispensing a dose of flavouring comprising:
providing a flavouring chamber with flavouring;
locating a dosing plate having an aperture therethrough in a first position such that the aperture communicates with a flavouring chamber and receives a predetermined dose of flavouring;
moving the dosing plate relative to a dispense opening from the first position to a second position at which the aperture communicates with the dispense opening for dispensing the dose of flavouring; wherein
the dispense opening is located within the flavouring chamber, and wherein a separating surface is located over the dispense opening and configured to separate an upper side of the aperture from the flavouring chamber at least while the dosing plate is in the second position; and
wherein a guiding member is used to vertically guide and compresses the flavouring into the aperture of the dosing plate, wherein the guiding member is a wedging member having an inclined surface located over the aperture at a position between the first and second position, the inclined surface being acutely inclined to a direction of movement of the dosing plate from the first position to the second position, and wherein the wedging member comprises the separating surface, wherein the wedging member is releasably coupled to the flavouring chamber such that the wedging member is located over an upper surface of the dosing plate and is fixedly held with respect to the flavouring chamber, and wherein the dosing plate is removable from the flavouring chamber through the flavouring chamber when the wedging member is decoupled from the flavouring chamber.

* * * * *